United States Patent [19]

Gilb

[11] Patent Number: 5,150,982
[45] Date of Patent: Sep. 29, 1992

[54] DECK POST TIE

[75] Inventor: Tyrell T. Gilb, Berkeley, Calif.

[73] Assignee: Simpson Strong-Tie Company, Inc., San Leandro, Calif.

[21] Appl. No.: 491,325

[22] Filed: Mar. 9, 1990

[51] Int. Cl.[5] .............................. F16B 9/00; E04B 1/38
[52] U.S. Cl. ................................. 403/232.1; 403/233;
403/403; 52/712; 52/714
[58] Field of Search ................. 403/232.1, 233, 283,
403/403, 382, 205; 52/712, 714, 715; 72/379.2

[56] References Cited

U.S. PATENT DOCUMENTS

| | | | |
|---|---|---|---|
| 1,945,925 | 2/1934 | Stiefel | 52/714 X |
| 4,330,971 | 5/1982 | Auberger | 403/232.1 X |
| 4,410,294 | 10/1983 | Gilb et al. | 403/232.1 X |
| 4,414,785 | 11/1983 | Howell | 403/232.1 X |
| 4,572,695 | 2/1986 | Gilb | 403/232.1 |
| 4,669,235 | 6/1987 | Reinen | 403/403 X |

Primary Examiner—Peter M. Cuomo
Attorney, Agent, or Firm—James R. Cypher

[57] ABSTRACT

An upright connection including a rigid one-piece connector for joining an upright supported member to a support structure having a support surface and an angularly related edge surface. The connector includes an elongated rigid back member which is connected to the angularly related edge surface of the support structure and in combination with side members, encapsulates the upright supported member. Fasteners inserted through openings in flange members connected to the side members attach the connector to the support surface, and fasteners inserted through openings in the side members attach the upright supported member to the connector. The connection is used primarily in connecting guard rail posts to a wood deck structure.

9 Claims, 5 Drawing Sheets

DECK POST TIE

BACKGROUND

This invention relates to a one-piece rigid connector for joining an upright supported member to a support structure having a support surface and an angularly related edge surface. An example of such a structure is a guard rail post attached to a deck structure.

Traditionally, one piece connectors have not been used in building such structures. Instead, guard posts have been connected to deck structures by bolts, lag screws and nails in various wood-to-wood configurations.

SUMMARY OF THE INVENTION

The gist of the present invention is the use of a one-piece sheet metal connector which permits the base of the deck post to rest on top of the deck and to be aligned flush with the edge of the deck.

An object is to encapsulate the base of the post on at least three side.in a secure manner which provides overturn resistance in at least three directions.

Another object is to provide a connector which provides secure attachment of the post to the deck edge.

A further object is to provide a connector which provides connection of the sides of the post to the deck surface.

Still another object is to provide shear attachment between the connector and the surface of the deck and to resist overturn of the post.

A further object is to provide a connector which registers with the post and deck so that no raw edges are exposed which could cause injury.

A still further object is to provide a connector which can be used on a deck regardless of the directional orientation of the deck boards.

Finally, the connector must be suitable for installation of a corner post.

DESCRIPTION OF THE PREFERRED EMBODIMENT

The present invention is an upright wood post connection 1 comprising an upright supported member 2 having a longitudinal axis 3, a base 4, a back side 5, and first and second side faces 6 and 7; a support structure 8 having a first support surface 9 and a second support surface 10 angularly related thereto; a rigid one connector 11 having: (1) an elongated rigid overturning moment resistant structural back member 12 having a longitudinal axis 13 and a lower portion 14 in registration with a portion of the second support surface 10 of the support structure 8 and an upper portion 15 in registration with a portion of the back face 5 of the upright supported member 2; (2) a first side member 16 connected to the upper portion 15 of the elongated rigid back member 12 and disposed for connection to the first side 6 of the upright supported member 2; (3) a second side member 17 connected to the upper portion 15 of the elongated rigid back member 12 and disposed for connection to the second side 7 of the upright supported member 2; (4) a first flange member 18 connected to the first side member 16 of the rigid one-piece connector 11 and disposed for connection to the first support surface 9 of the support structure 8; (5) a second flange 19 connected to the second side member 17 and disposed for connection to the first support surface 9 of the support structure 8; back connector fastening means 20 joining the lower portion 14 of the elongated rigid back member 12 to the second support surface 10 of the support structure 8; side connector fastening means 21 respectively joining the first and second sides 16 and 17 of the rigid one-piece connector 11 to the first and second sides 6 and 7 of the upright supported member 2; and flange connector fastening means 22 respectively joining the first and second flange members 18 and 19 to the first support surface 9 of the support structure 8.

Back connector fastening means 20, side connector fastening means 1, and flange connector fastening means 22 are preferably nails which may be driven by a hand held hammer. Instead of nails, wood screws may also be used.

The attachment of railing posts to decks is subject to 1985 Uniform Building Code, Section 1711 which provides that commercial type railing shall be 42" high, and residential type railing shall be 36" high, with 50 lbs./ft. resistance value to overturn.

Assuming post centers at about 4' on center for example, this requires residential posts to have a resistance value at rail height of 80 lbs., times safety factor of 3, or measured 240 lbs. Commercial or occupancy load of 50 or greater requires, in the same example, 800 lbs of tested load resistance per post.

To meet code requirements, the rigid one-piece connector 11 may be formed with an elongated rigid back member 12 having a sufficient thickness throughout its length to resist buckling upon the application of a selected force acting at an angle against the longitudinal axis 3 of the upright member 2.

To provide overturning moment resistance and to reduce the weight of the connector, overtugning moment means is structural preferably formed in the elongated rigid back member 12 of the connector for resisting failure due to bending upon the application of a selected force acting at an angle against the longitudinal axis 3 of the upright supported member 2.

Figure 1:
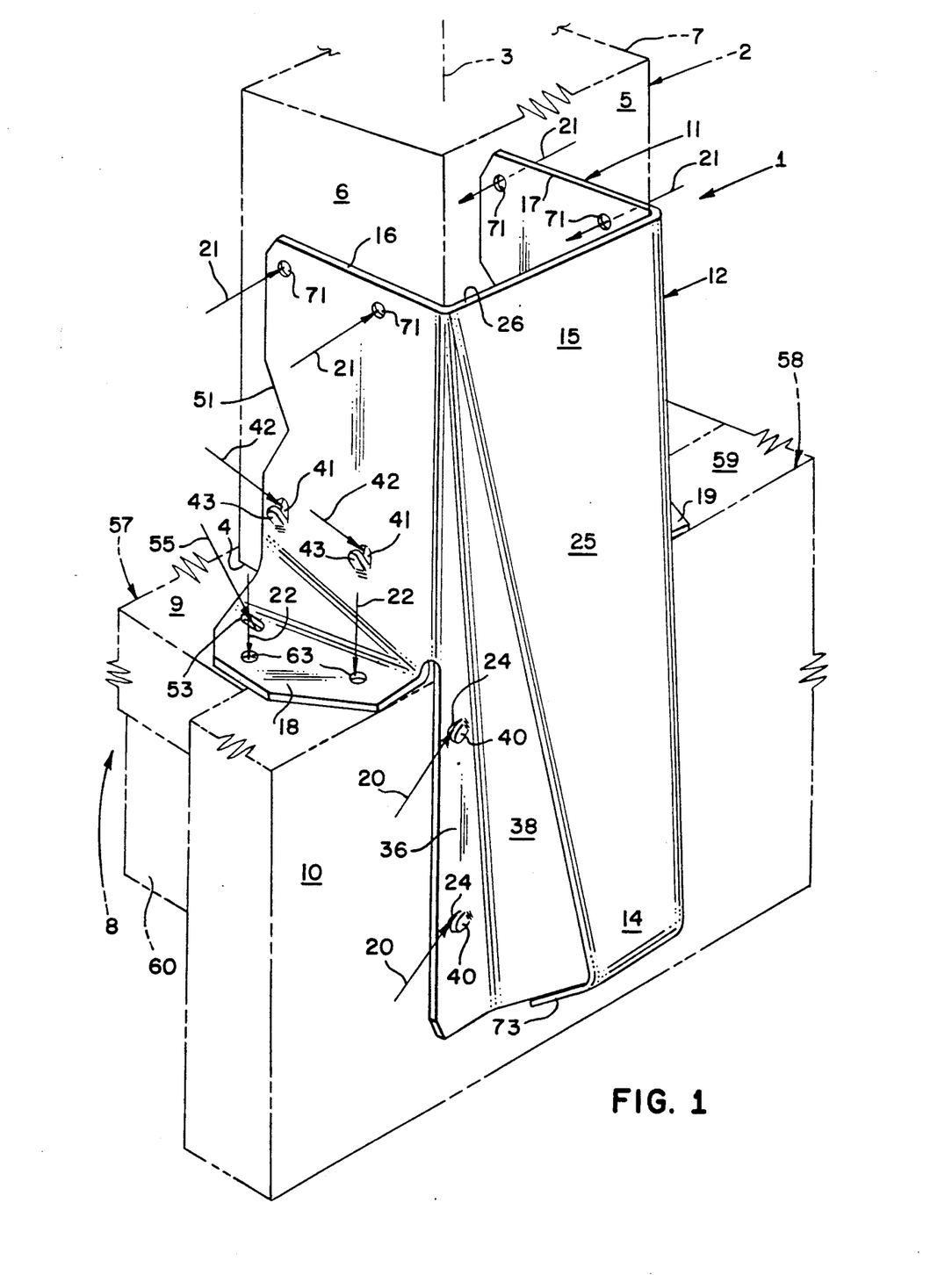
FIG. 1 is a perspective view of the connector of the present invention attached to a deck post, deck boards and deck edge board.
Figures 6, 7:
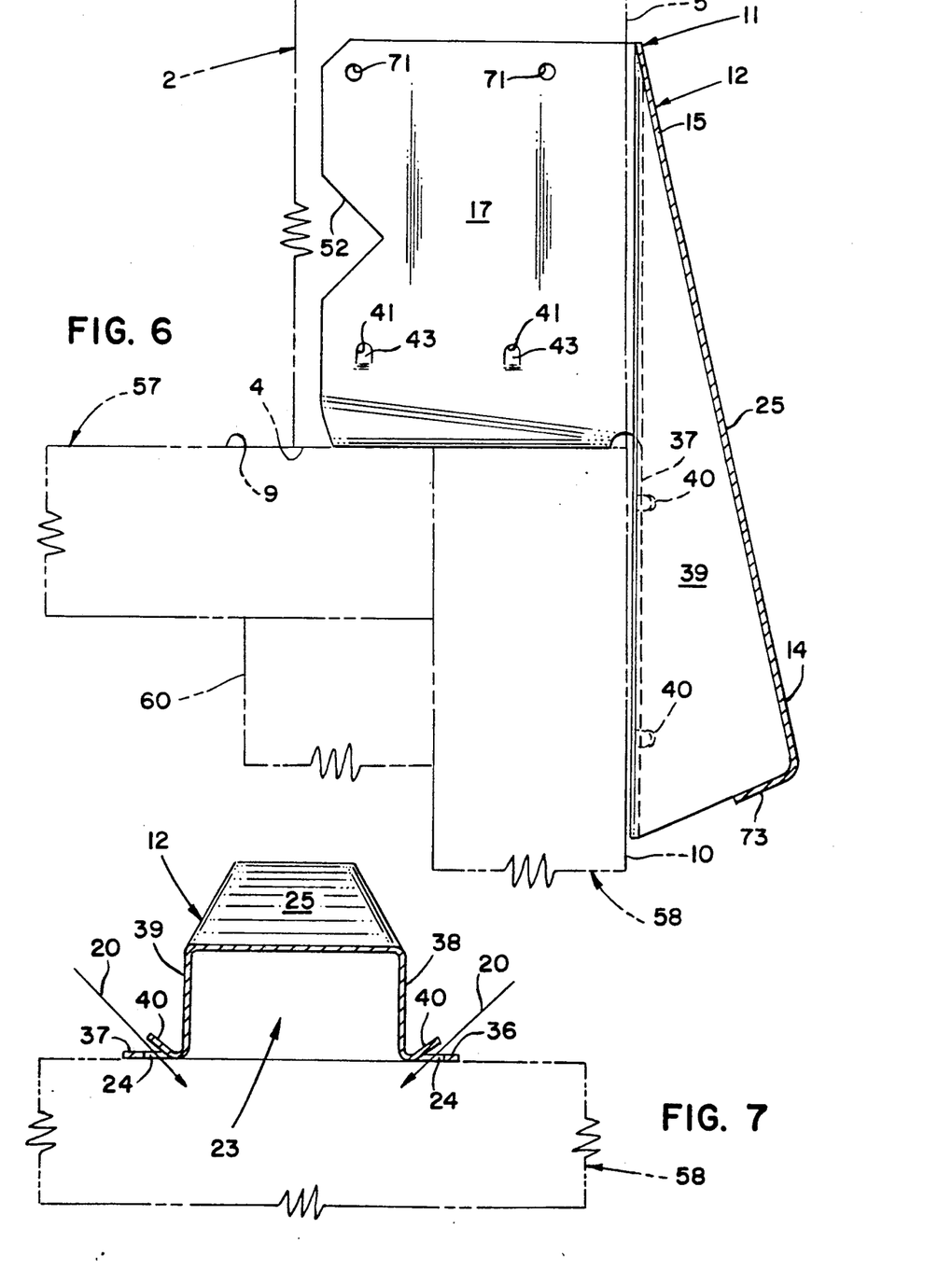
FIG. 6 is a cross sectional view of the connector taken along line 6—6 in FIG. 3.
FIG. 7 is a cross sectional view of the connector taken along line 7—7 in FIG. 4.
Figure 8:
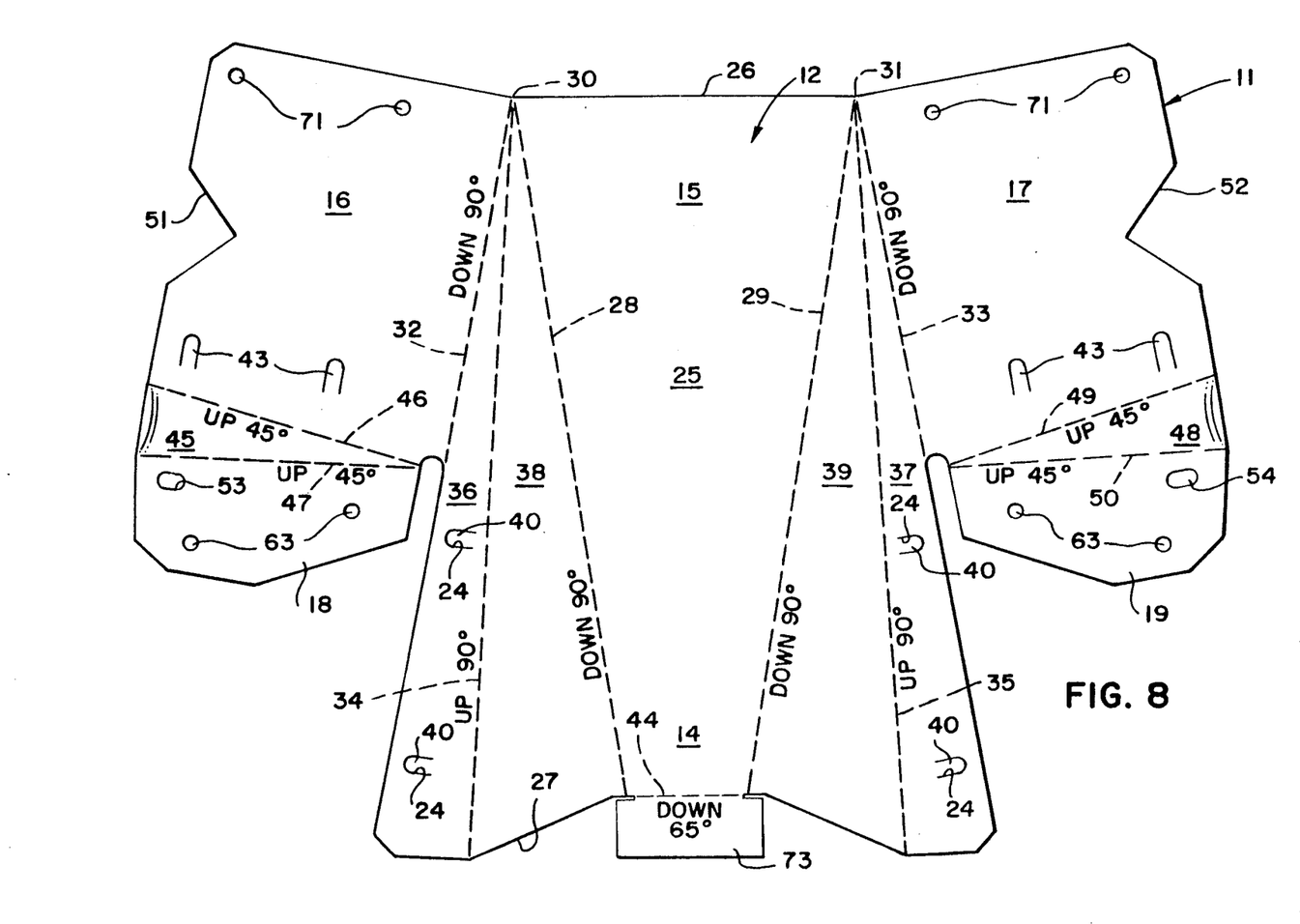

Preferably, an otuer back member is formed in a portion of the elongated rigid overturned moment resistant structural back member 12 of rigid one-piece connector 11 with a channel-like shape portion 23 as shown in cross section in FIG. 7 throughout a substantial longitudinal portion of the elongated rigid back member 12. As best shown in FIGS. 1, 7 and 8, the channel-like shaped portion 23 is formed with a first triangular shaped side 38, a truncated pyramid shaped portion 25, and a second triangular shaped side 39.

To improve the holding power of rigid one-piece connector 11, the lower portion 14 of the elongated rigid back member 12 is formed with a plurality of openings 24 configured to provide insertion of the back connector fastening means 20 respectively therethrough and in a direction other than orthogonally to the plane of the second support surface 10.

Preferably the back connector fastening means 20 are nails driven by a hammer, and the plurality of openings 24 may be either restricted openings formed as a slot and a tab-like member or an obround opening; both of which are described and claimed in my patent Gilb U.S. Pat. No. 4,480,941 DOUBLE SHEAR ANGLED FASTENER CONNECTOR granted Nov. 6, 1984. The obround hole opening is further described and claimed in my pate3nt Gilb, U.S. Pat. No. 4,230,416, RESTRICTED SLOT NAIL OPENINGS FOR SHEET METAL FRAMING CONNECTORS, granted Oct. 28, 1980.

Figures 4, 5:
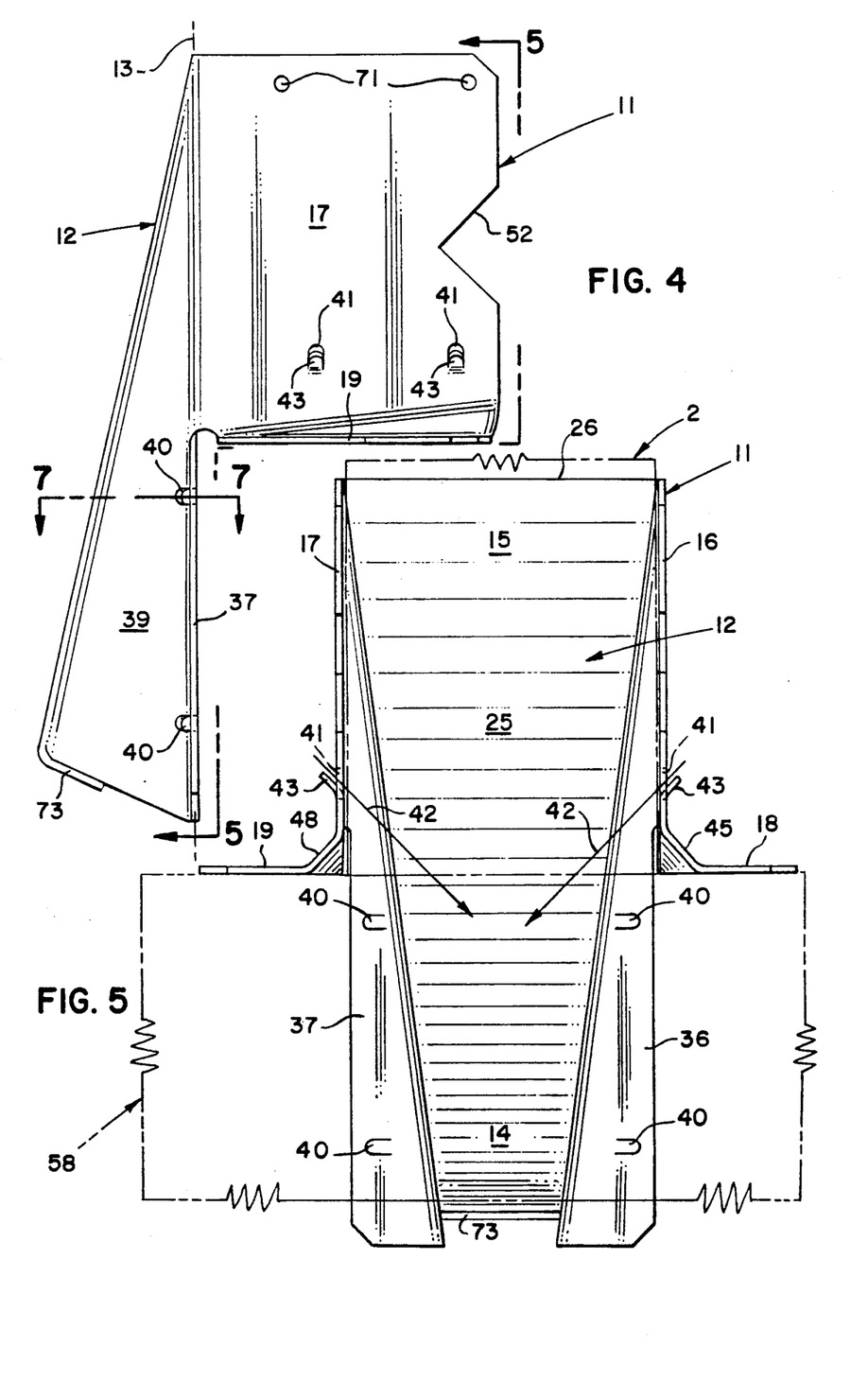
FIG. 4 is a side elevation view of the connector illustrated in FIG. 1.
FIG. 5 is a front elevation view of the connector taken along line 5—5 in FIG. 4.

In a preferred construction, the first and second side members 16 and 17 are formed with a plurality of slant nail openings 41 positioned adjacent the first support surface 9 and configured to provide insertion of fasteners respectively therethrough and in a direction other than orthogonally to the plane of the respective first and second side faces 6 and 7 of the upright supported member 2. These slant nail openings 41 are formed with a directional tab 43 and are the same as the openings described in my U.S. Pat. No. 4,230,416 supra. A plurality of slant-nail fasteners 42 dimensioned for insertion respectively through said slant-nail openings, are also driven through a portion of said upright supported member 2 and into first support surface 9. FIG. 5 illustrates how slant nail fasteners 42 extend into first support surface 9 and cause the fasteners to be placed in double shear when joining upright support member 2 and first support surface 9.

The channel-like shape portion 23 may be formed in various configurations and a preferred form is shown in the drawings. Preferably, the channel-like shape tapers outwardly from the upper portion of the elongated rigid back member to the lower portion of the elongated rigid back member. As shown in FIGS. 1, 2, 3, 4, and 6, truncated pyramid shaped portion 25 extends all the way from upper edge 6 to lower edge 44. As shown in FIGS. 1 and 8, first and second triangular shaped sides 38 and 39 increase in width as they extend from edge 26 to edge 44. Thus the ability to resist overturning moment imposed on upright supported member 2 increases with the depth of the truncated pyramid shaped portion 25.

As shown in FIGS. 1, 5, and 8, resistance to overturning of upright supported member 2 can be greatly increased in the directions parallel to second support surface 10 by forming a rigid one-piece connector so that first flange 18 is connected to first side member 16 on a curved radius. The curved radius may be approximated by forming a triangular shaped portion 45 by bending upwardly 45° along bend lines 46 and 47. Second flange member 19 may be connected to second side member 17 on a curved radius. The curved radius may be approximated by forming a triangular shaped portion 48 by bending upwardly 45° along bend lines 49 and 50.

A method of making a rail post base for decks of the present invention consists of the steps of: selecting a sheet metal blank as illustrated in FIG. 8 having a gauge thickness suitable for machine bending and of sufficient rigidity to withstand bending forces as well as to withstand shear forces; cutting the sheet metal blank so as to form an elongated rigid back member 12 having a truncated pyramid shaped portion 25, a first side member 16 joined to an upper portion 15 of the elongated rigid back member 12, a second side member 17 joined to the other side of the upper portion 15 of the elongated rigid back member 12, a first flange member 18 connected to the first side member 16, and a second flange 19 connected to the second side member 17; bending the first flange member 18 upwardly 90° relative to the first side member 16; bending the second flange member 19 upwardly 90° relative to the second side member 17; bending the first side member downwardly 90° along a first bend line 32; bending the second side member downwardly 90° along a second bend line 33; bending a truncated pyramid shaped portion 25 of the elongated rigid back member 12 downwardly approximately 90° along third and fourth bend lines 28 and 29 which converge from first and second starting points 30 and 31 along a top edge line 26 and extend to a bottom edge 44 in the elongated rigid back member 12; bending a first triangular shaped portion 36 of the elongated rigid back member 12 upwardly approximately 90° along a fifth bend line 34 adjacent to and diverging from the first bend line 32; and bending a second triangular shaped portion 37 of the elongated rigid back member 12 upwardly approximately 90° along a sixth bend line 35 adjacent to and diverging from the second bend line 33.

It has been found that notching certain edges of the rigid one-piece connector 11 and painting it black gives a more rustic aesthetic appearance to the overall deck structure. Accordingly, one or more notches 51 and 52 are formed in first and second side members 16 and 17.

Figure 3:
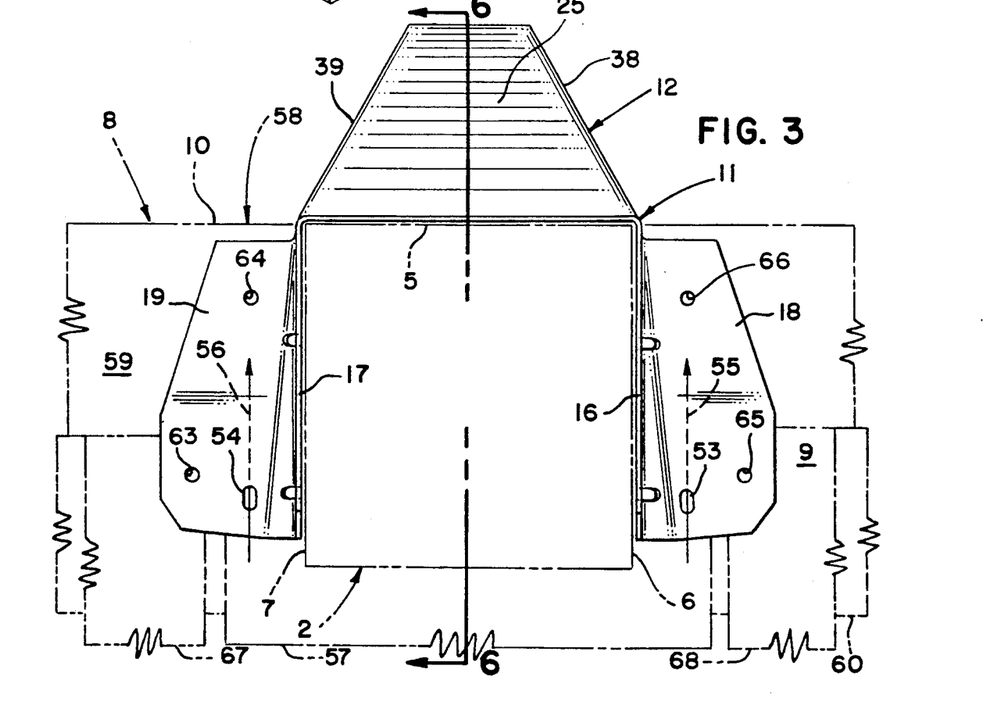
FIG. 3 is a top plan view of the connector shown in FIGS. 1 and 2 with portions of the deck post and deck shown in phantom line.

Referring to FIGS. 1, 3 and 8, it may be seen that an obround opening 53 is punched in first flange member 18, and an obround opening 54 is punched in second flange member 19. The purpose of providing obround opening 53 and 54 is to permit nails or other type fasteners 55 and 56 to be inserted through the obround openings at an angle and then hammered or screwed into deck board 56 and then on into facia board 58. The important fact to be considered is that fastener nails 55 and 56 are now placed in double shear and the ability of the rigid one-piece connector 11 to resist overturning moment in a direction toward the outside of the deck is greatly increased. Since nails 55 and 56 are embedded in two pieces of wood; viz. deck board 57 and facia board 58, the resistance provided by nails 55 and 56 are the shear value of the nails rather than the resistance to straight pull out which would be considerably less.

Figure 2:
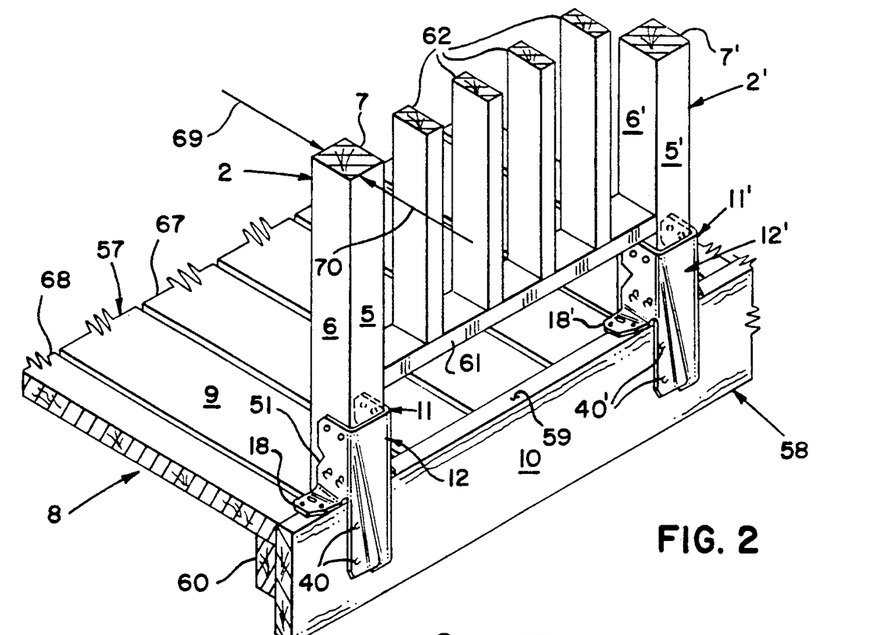
FIG. 2 is a perspective view of two connectors attached to portion of two posts and a portion of a deck.

FIG. 2 illustrates one method of constructing a deck using the present invention. Two rigid one-piece connectors 11 and 11' are shown. Both are identical and like parts of the second connector are identified by numbers ending with a prime ('). The top surfaces of the deck boards 57 are shown flush with the top edge 59 of facia board 58. The deck boards could have been placed on top of the facia board 58 and the invention would. still work satisfactorily. As shown, a ledger board is attached 60 to facia board 58 and the ends of deck boards 57 rest on the top edge of the ledger board 60. A lower rung 61 is attached to upright supported members 2 and 2' and balusters 62 are connected to the lower rail.

A feature of the present invention is the fact that the same rigid one-piece connector 11 can also be used to support a corner post by simply bending down one of the flange members so that it is on the same plane as the side member. Instead o a to the top of the deck board, the flange member which is bent down attaches to the facia board.

Installation

Installation of the rigid one-piece connector 11 is as follows. The deck is constructed as previously stated and one example is illustrated in FIGS. 1 and 2. When the connector is correctl located, nails 22 are driven through openings 63 in first and second flange members 18 and 19. Nail 22 driven through opening 63 engages deck board 67, nail 22 driven through opening 65 engages deck board 68, and nails 22 driven through openings 64 and 66 engage facia board 58. Forces on bottom railing 61 attached to posts 2 and 2' exert a force primarily at right angles to the direction of the driven nails 22 and all of the nails bearing the number 22 would be in shear. Forces, as shown by arrow 69, on the top rail (not shown) would exert a moment force which would exert an overturnign force on the posts 2 and 2' and result in a force tending to pull the nails attached to first and second flange members 18 and 19 upwardly. To provide moment resistance, nails 55 and 56 are driven on a slant as shown in FIGS. 1 and 3 through obround openings 53 and 54. This places nails 55 and 56 at least in single shear. In most instances, nails 55 and 56, when driven on a slant as shown in FIGS. 1 and 3, penetrate deck board 57 as well as facia board 58 which causes nails 55 and 56 to be placed in double shear thereby increasing the resistance of the nails to the overturning moment forces.

Next, nails 20 are driven on a slant through openings 24 as guided by tabs 40 as illustrated in FIGS. 1 and 7. Very little downward force is exerted on nails 20 since the posts 2 and 2' rest on the deck boards 57 and facia board 58. Nails 20, however must resist forces imposed on the railing and posts as represented by arrow 70. Such a force would tend to subject nails to pull-out, but since nails 20 are driven at a slant, they would be in shear, thus contributing a great deal more resistance.

Nails 21 are driven though openings 71 as illustrated in FIG. 1. Nails 21 resist downward forces as well as overturning moment forces in shear. Openings 71 need only be round so that nails 21 will be orthogonally driven.

As previously stated, nails 42 driven through openings 41 and guided by tabs 43 engage post 2 as well as either deck board 57 or facia board 58. As a result, nails 42 are in double shear and provide resistance to overturning forces caused by either forces 69 or 70.

Encapsulation of posts 2' and 2 on three sides by first and second side members 16 and 17 results in stabilizing the posts as well or better than bolted posts.

As illustrated in FIGS. 1, 4, 6, and 8, a folded edge extension 73 attached to lower edge 44 of truncated pyramid shaped portion 25 is bent downwardly at a 65° angle to provide stiffness to the channel like shaped portion 23.

I claim

1. A wood post connection comprising:
   a. an upright supported wood post member having a longitudinal axis, a base, a back side, and first and second sides;
   b. a support structure having a first support surface for receiving said base of said upright supported wood post member thereon and a second support surface angularly related to said first support surface and substantially in the plane of said backside of said upright supported wood post member;
   c. a rigid one piece connector having:
      1. an elongated rigid overturnign moment resistant structural back member having a longitudinal axis including disposed upper flush portions in registration with said backside of said upright supported wood post member and disposed lower flush portions extending linearly beyond said base of said upright supported wood post member in registration with a portion of said second support surface of said support structure and an outer back member formed ins aid elongated rigid overturning moment resistant structural back member of said rigid one piece connector including a first triangular shaped side member integrally connected to said upper and lower flush portions of said rigid overturning moment resistant back member and said first triangular shaped side member extending angularly outwardly from said second support surface for resisting buckling upon the application of a selected moment force acting at an angle against said longitudinal axis of said upright supported wood post member;
      2. a first side member angularly and integrally connected to a substantial portion of said upper flush portion of said elongated rigid overturning moment resistant structural back member and disposed for connection to said first side of said upright supported wood post member;
      3. a second side member angularly and integrally connected to a substantial portion of said upper flush portion of said elongated rigid overturnign moment resistant structural back member and disposed for connection to said second side of said upright supported wood post member;
      4. a first flange member angularly and integrally connected to a substantial portion of said first side member of said rigid one-piece connector and disposed for connection to said first support surface of said support structure;
      5. a second flange member angularly and integrally connected to a substantial portion of said second side member of said rigid one-piece connector and disposed for connection to said first support surface of said support structure;
   d. back connector fastening means joining said lower flush portion of said elongated rigid overturning moment resistant structural back member to said second support surface of said support structure;
   e. side connector fastening means respectively joining said first and second sides of said rigid one-piece connector to said first and second sides of said upright supported wood post member; and
   f. flange connector fastener means respectively joining said first and second flange members to said first support surface of said support structure.

2. A wood post connection as defined in claim 1 wherein:
   a. a portion of said elongated rigid overturning moment resistant structural back member of said rigid one-piece connector is formed with a channel-like shape throughout a substantial longitudinal portion of said elongated rigid overturning moment resistant structural back member.

3. A wood post connection as defined in claim 2 wherein:
   a. said channel-like shape of said elongated rigid overturning moment resistant structural back member tapers outwardly from said upper flush portions of said elongated rigid overturning moment resistant structural back member to said lower portion of said elongated rigid overturning moment resistant structural back member.

4. A wood post connection as defined in claim 3 wherein:
   a. said first flange member is connected to said first side member of said rigid one-piece connector on a curved radius; and
   b. said second flange member is connected to said second side member of said rigid one-piece connector on a curved radius.

5. A wood post connection as defined in claim 1 comprising:
   a. said lower flush portions of said elongated rigid overturning moment resistant structural back member are formed with a plurality of openings configured to provide insertion of said back connector fastening means respectively therethrough and in a direction other than orthogonally to the plane of said second support surface and in a plane substantially parallel to the plane of said first support surface.

6. A wood post connection as defined in claim 1 comprising:
   a. said first and second side members are formed with a plurality of slant nail openings positioned adjacent said first support surface and configured to provide guided insertion of fasteners respectively therethrough and in a direction other than orthogonally to the plane of said respective first and second side faces of said upright supported member in a direction toward said first support surface; and
   b. a plurality of slant-nail fasteners dimensioned for insertion respectively through said slant-nail openings, through a portion of said upright supported wood post member and into said first support surface.

7. A wood post connection as described in claim 1 comprising:
   a. said support structure is a wood deck in which said first support surface is the top face of a floor board and said second support surface is the side face of a facia board; and
   b. said base of said post is positioned so that said base of said wood post rests on said top face of said floor board and said back side of said wood post is positioned generally flush with said side face of said facia board.

8. A method of making a deck post tie for decks comprising:
   a. selecting a sheet metal blank having a gauge thickness suitable for machine bending and of sufficient rigidity to withstand bending forces as well as to withstand shear forces:
   b. cutting said sheet metal blank so as to form an elongated rigid overturning moment resistant structural back member having a truncated pyramid shape, a first side member angularly and integrally joined to a substantial portion of the other side of said upper portion of said elongated rigid overturning moment resistant structural back member, a second side member angularly and integrally joined to a substantial portion of the other side of said upper portion of said elongated rigid overturning moment resistant structural back member, a first flange member connected to said first side member, and a second flange member connected to said second side member;
   c. bending said first flange member upwardly 90° relative to said first side member;
   d. bending said second flange member upwardly 90° relative to said second side member;
   e. bending said first side member downwardly 90° along a first bend line;
   f. bending said second side member downwardly 90° along a second bend line;
   g. bending a truncated pyramid shaped portion of said elongated rigid overturnign moment resistant structural back member downwardly approximately 90° along third and fourth bend lines which converge from first and second starting points and along a top edge line and extend to a bottom edge of said elongated rigid overturning moment resistant structural back member;
   h. bending a first triangular shaped portion ofs aid elongated rigid overturnign moment resistant structural back member upwardly approximately 90° along a fifth bend line adjacent to and diverging from said first bend line; and
   i. bending a second triangular shaped portion of said elongated rigid overturning moment resistant structural back member upwardly approximately 90° along a sixth bend line adjacent to and diverging from said second bend line.

9. An wood post connection comprising:
   a. an upright supported wood post member having a longitudinal axis, a base, a back side, and first and second sides;
   b. a support structure having a first support surface for receiving said base of said upright supported wood post member thereon and second and third support surfaces angularly related thereto and to each other;
   c. a rigid one piece connector having:
       an elongated rigid overturning moment resistant structural back member having a longitudinal axis including disposed upper flush portions in registration with said backside of said upright supported wood post member and disposed lower flush portions extending linearly beyond said base of said upright supported wood post member in registration with a portion ofs aid second support surface of said support structure and an outer back member formed in said elongated rigid overturning moment resistant structural back member of said rigid one piece connector including a first triangular shaped side member integrally connected to said upper and lower flush portions of said rigid overturning moment resistant back member and said first triangular shaped side member extending angularly outwardly from said second support surface for resisting buckling upon the application of a selected moment force acting at an angle against said longitudinal axis of said upright supported wood post member;
       a first side member angularly and integrally connected to a substantial portion of said upper portion of said elongated rigid overturning resistant structural back member and disposed for connection to said first side of said upright supported wood post member;
       a second side member angularly and integrally connected to a substantial portion of said upper portion of said elongated rigid overturning moment resistant structural back member and disposed for connection to said second side of said upright supported wood post member;

a first flange member integrally connected to a substantial portion of said first side member of said rigid one-piece connector and disposed for connection to said third support surface of said support structure;

a second flange angularly and integrally connected to a substantial portion of said second side member of said rigid one-piece connector and disposed for connection to said first support surface of said support structure;

d. back connector fastening means joining said lower portion of said elongated rigid overturning moment resistant structural back member to said second support surface of said support structure;

e. side connector fastening means respectively joining said first and second sides of said rigid one-piece connector to said first and second sides of said upright supported wood post member; and f. flange connector fastener means respectively joining said first and second flange members to said third and first support surfaces of said support structure.

* * * * *